United States Patent [19]
Cloeren et al.

[11] Patent Number: 5,679,387
[45] Date of Patent: *Oct. 21, 1997

[54] INTERNAL DECKLE SYSTEM

[75] Inventors: Peter F. Cloeren, Orange; Rolf P. Schulz, Bridge City, both of Tex.

[73] Assignee: The Cloeren Company, Orange, Tex.

[*] Notice: The term of this patent shall not extend beyond the expiration date of Pat. No. 5,505,609.

[21] Appl. No.: 465,602

[22] Filed: Jun. 5, 1995

Related U.S. Application Data

[63] Continuation of Ser. No. 175,940, Dec. 30, 1993, abandoned, which is a continuation of Ser. No. 915,485, Jul. 17, 1992, abandoned.

[51] Int. Cl.$^6$ .................................................. B29C 47/16
[52] U.S. Cl. .................. 425/381; 264/169; 425/382.4; 425/466
[58] Field of Search .......................... 425/145, 147, 425/377, 381, 382.4, 466; 264/169

[56] References Cited

U.S. PATENT DOCUMENTS

| | | | |
|---|---|---|---|
| 3,018,515 | 1/1962 | Sneddon | 425/466 |
| 3,107,191 | 10/1963 | Brown et al. | 425/377 |
| 3,132,377 | 5/1964 | Allenbaugh et al. | 425/466 |
| 3,647,346 | 3/1972 | Minnie . | |
| 3,680,997 | 8/1972 | Dukert et al. | 425/381 |
| 3,706,518 | 12/1972 | Bunte et al. | 425/466 |
| 3,711,235 | 1/1973 | Bunte et al. | 425/466 |
| 3,829,274 | 8/1974 | Melead | 425/466 |
| 3,832,120 | 8/1974 | Shaffer | 425/381 |
| 3,840,318 | 10/1974 | Solop | 425/466 |
| 3,870,454 | 3/1975 | Penrod | 425/466 |
| 4,057,385 | 11/1977 | Yazaki et al. | 425/466 |
| 4,248,579 | 2/1981 | Maejima | 425/227 |
| 4,293,517 | 10/1981 | Knox | 264/211.13 |
| 4,659,302 | 4/1987 | Maejima | 425/190 |

FOREIGN PATENT DOCUMENTS

| | | | |
|---|---|---|---|
| 6028573 | 5/1983 | Japan . | |
| 60-27614 | 7/1983 | Japan . | |
| 60-165218 | 8/1985 | Japan | 425/466 |
| 61-167523 | 7/1986 | Japan | 425/466 |
| 4307220 | 10/1992 | Japan . | |
| 2092512 | 8/1982 | United Kingdom . | |
| 2114050 | 8/1983 | United Kingdom . | |

OTHER PUBLICATIONS

Gylon Gasketing Literature.

*Primary Examiner*—Jay H. Woo
*Assistant Examiner*—Joseph Leyson
*Attorney, Agent, or Firm*—Timothy R. Kroboth

[57] ABSTRACT

An extrusion apparatus having an internal deckle system, includes a deckle blade that extends through an end of the apparatus into a flow passageway. The apparatus may beneficially include a cold-formable, sealing member for preventing leakage through the apparatus end. In a variation, the apparatus may include an upstream deckle plug that includes a sealing member formable under heat and compression to prevent leakage transversely past the upper deckle plug. In a further variation, a full width, upper deckle plug may extend through an end of the main body into the manifold. A wavy or scalloped edge may be avoided by an extended portion that extends downwardly and terminates at or near the exit orifice.

8 Claims, 6 Drawing Sheets

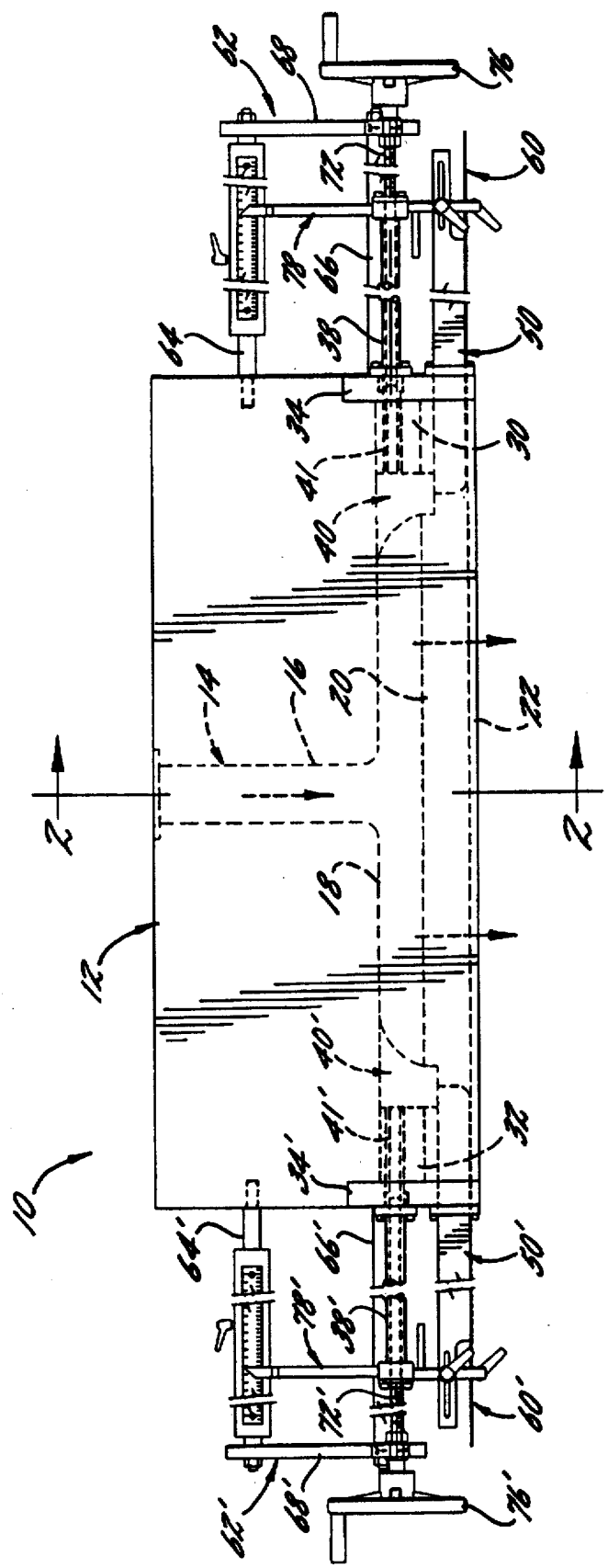

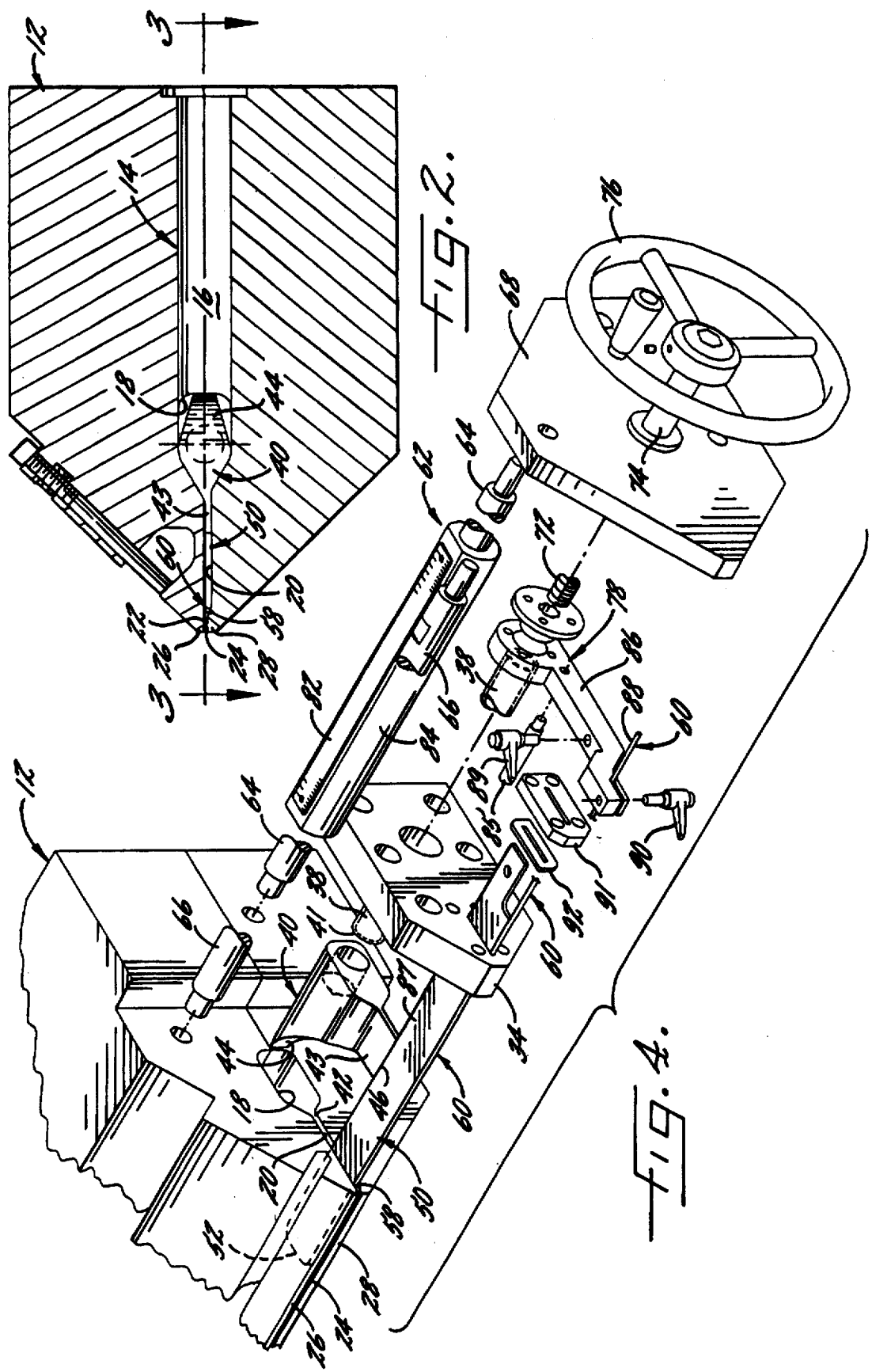

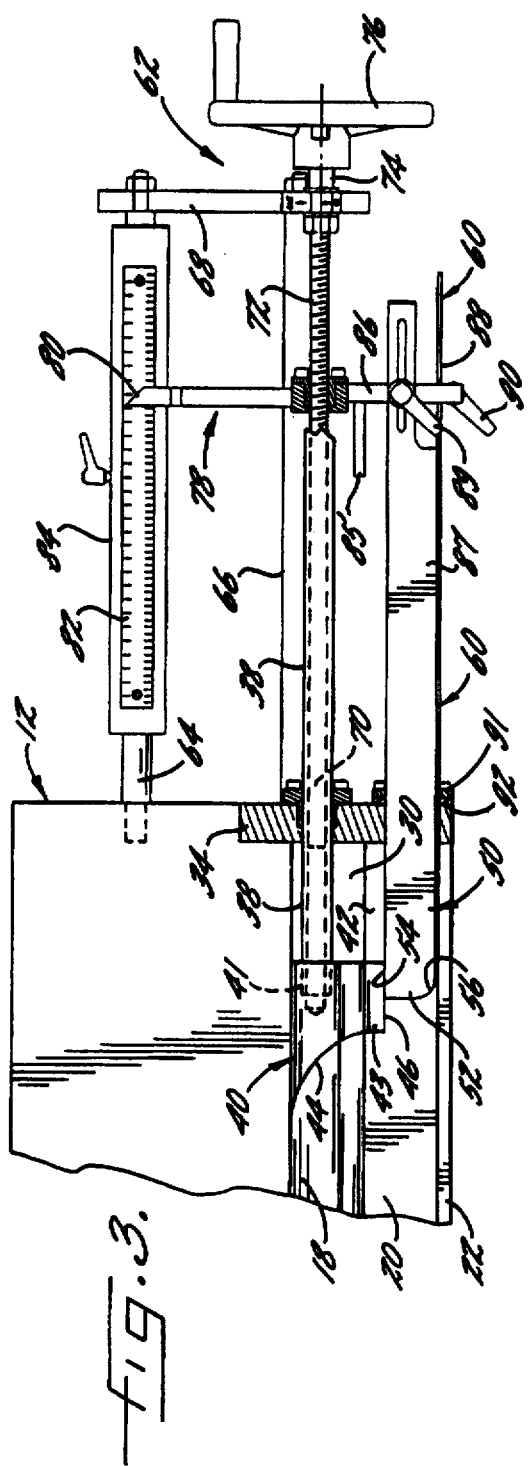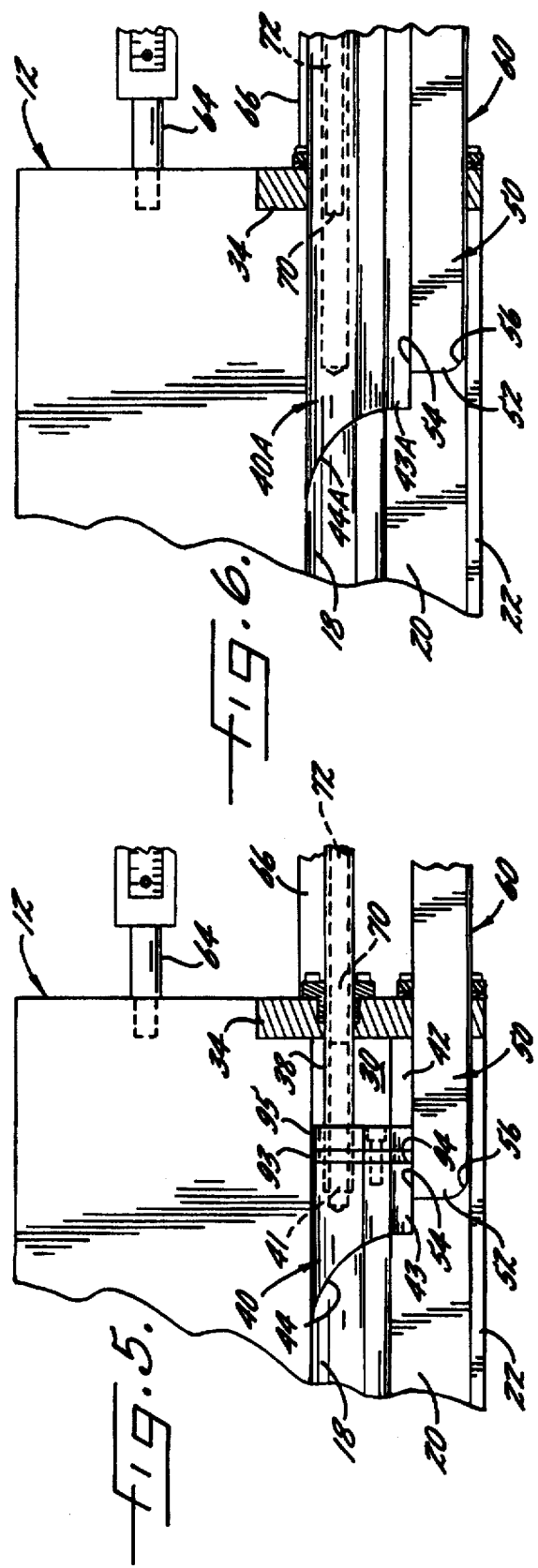

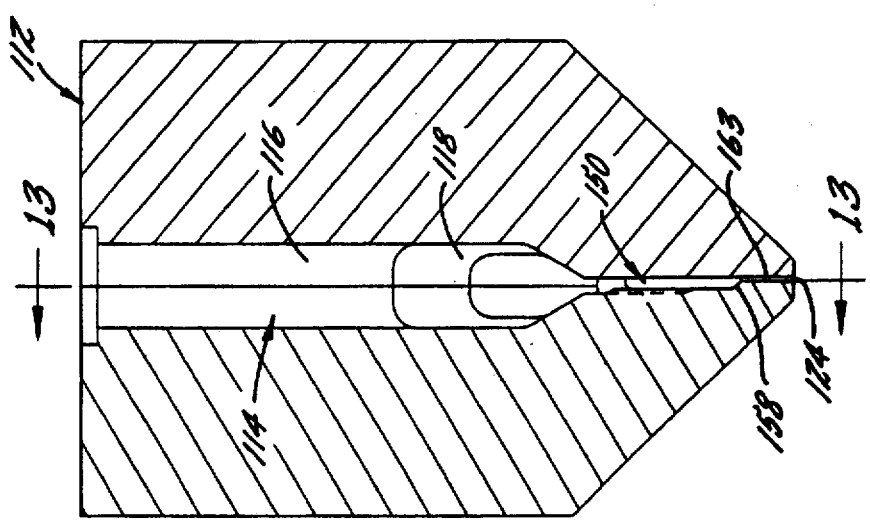
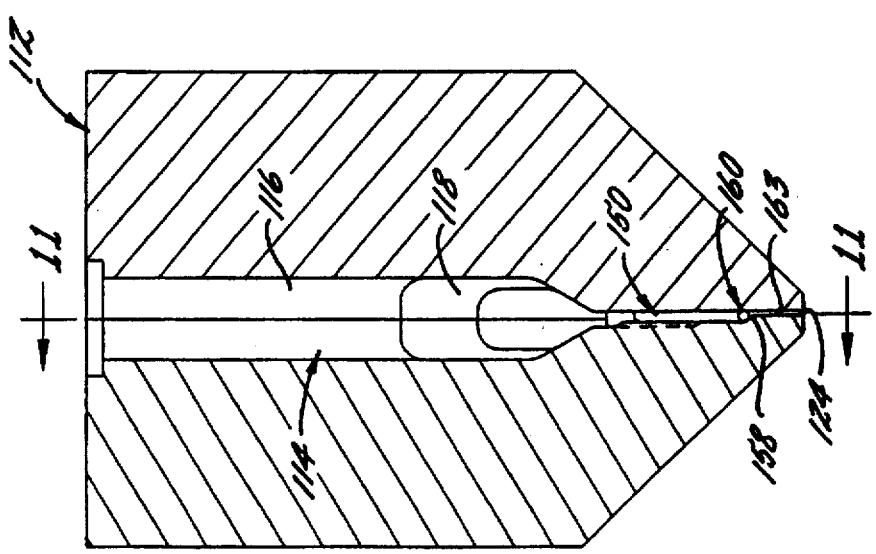
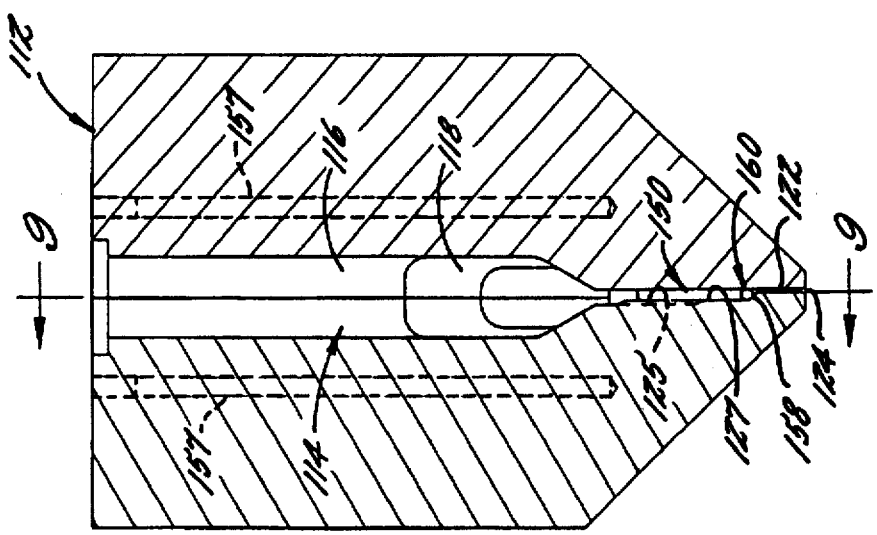

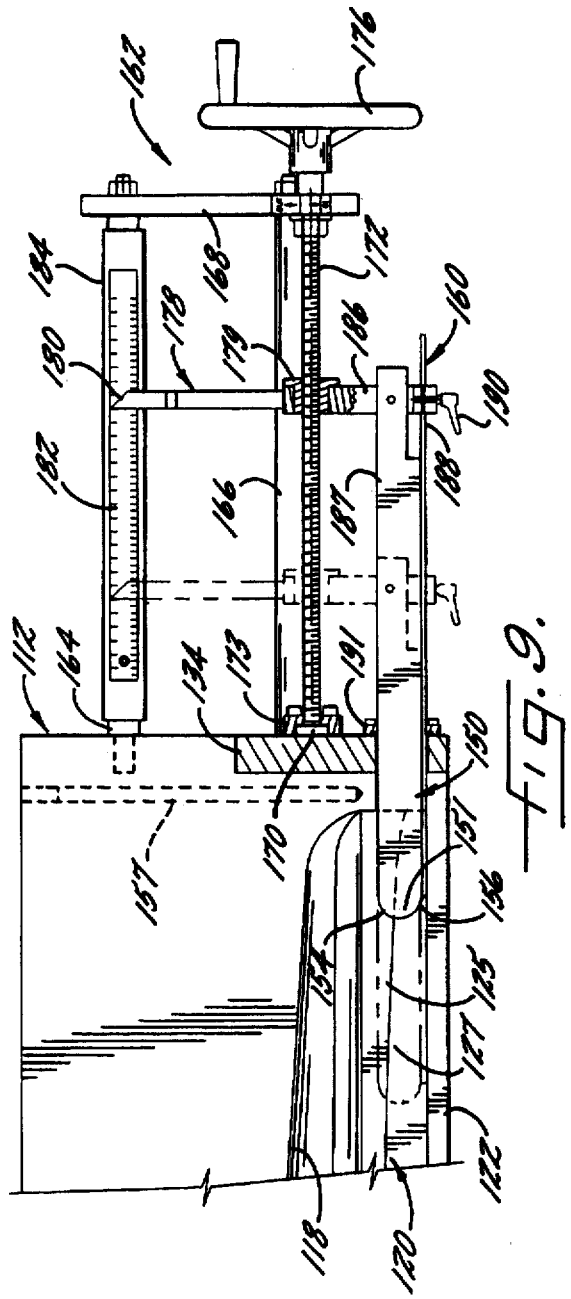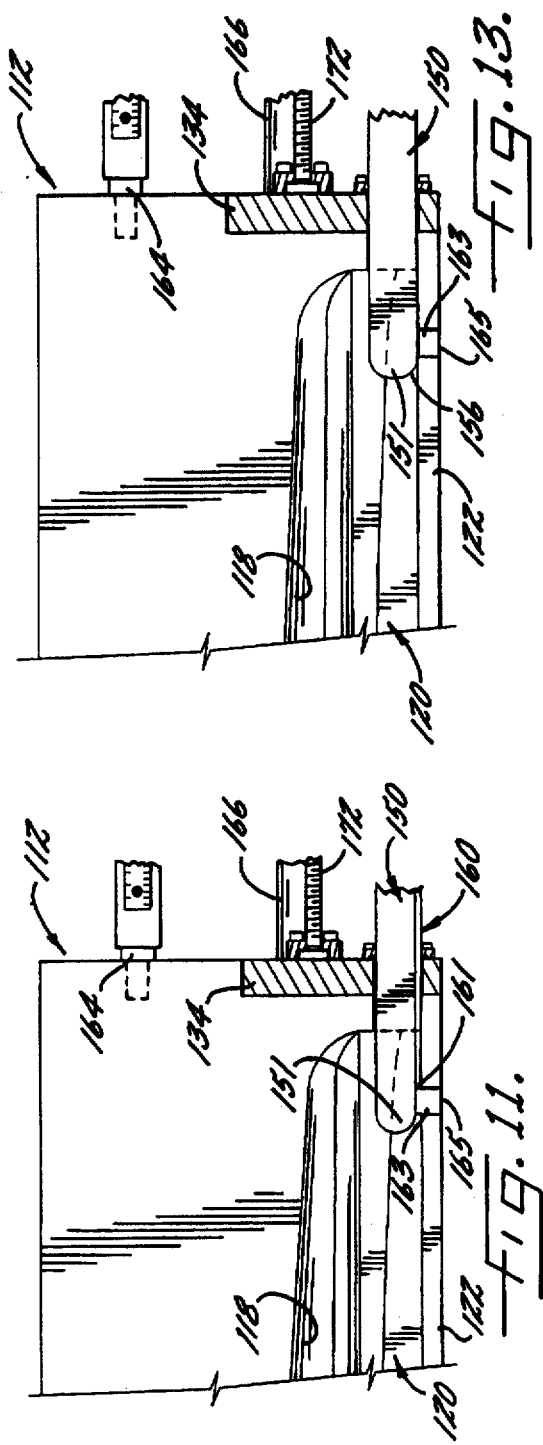

INTERNAL DECKLE SYSTEM

This application is a continuation of application Ser. No. 08/175,940, filed Dec. 30, 1993, now abandoned, which is a continuation of Ser. No. 07/915,485, filed on Jul. 17, 1992, now abandoned.

BACKGROUND OF THE INVENTION

This invention relates to an improved extrusion apparatus having an internal deckle system.

An extrusion apparatus having deckles defining the web width, is well known. The deckles may be internal, external, or an external/internal combination such as an external boat deckle with an internal deckle member. U.S. Pat. No. 3,870,454 to Penrod exemplifies a deckle system including an external supply tube for a cooling fluid, and a fin that projects upwardly through the exit orifice into the land channel and beyond into the upstream passageway. The fin is in heat exchange communication with the cooling supply tube. In cast film extrusion, an external deckle member disadvantageously results in a comparatively larger gap between, and limits the relative positioning of, the exit orifice and chill rolls.

Also known as illustrated by U.S. Pat. No. 4,057,385 to Yazaki et al, is an internal deckle system having a cooling supply tube that moves in sliding contact with the manifold inner surface, and having a fin that projects downwardly. The Penrod and Yazaki et al patents teach the use of a cooling fluid to increase resin viscosity and thus reduce leakage.

U.S. Pat. No. 3,028,515 to Sneddon teaches a two component, internal deckle with external adjustment. One component is provided by a cylindrical head or manifold plug that precisely fits within the manifold, and a fin that extends downwardly from the manifold plug. A downstream closure wire serves as the second component.

U.S. Pat. No. 4,248,579 to Maejima teaches a two component, internal deckle with geared, external adjustment. A support rod movably disposed within the manifold, and a flag that extends from an end of the support rod into the preland channel, serve as one component, and a downstream deckle rod serves as the second component. Adjustment is provided by a rotatable shaft in threaded engagement with an internally threaded bore of the support rod. This system provides for reduced edge bead and for web width control.

GB Patent Application 2,092,512 to Maejima teaches a similar two component, internal deckle system. Variations include a support rod or manifold plug that closely fits within the manifold, and a pendent flag having a concave trailing edge.

FIG. 3 of Japanese Patent Application 60-28573 and U.S. Pat. No. 4,659,302 to Maejima teach a three component, internal deckle that is similar to U.S. Pat. No. 4,248,579 to Maejima. Modifications include an upper deckle portion, an independently movable, lower deckle portion supported and controlled by a separate rod, and an inclined face on the upper deckle portion. The separately movable, lower deckle portion advantageously provides for improved edge bead reduction.

A downstream deckle rod serves as the third deckle component of this type of apparatus. In the '302 apparatus, a tongue-shaped protrusion extends downwardly from the tip of the deckle rod for preventing the formation of edge bead, and a drain hole is provided for removal of resin that leaks behind the upper and lower deckle portions despite a snug fit with the flow passageway.

A drawback with the separately moveable, lower deckle portion of this type of apparatus is its sensitivity to deflection during adjustment, with bending of the support rod typically necessitating operation shut down. Additionally, bending may also result from flow pressure on the end face of the lower deckle portion or from the pressure of leaking resin on the support rod.

Also sensitive to deflection is the deckle rod. Bending of the deckle rod may break the width-controlling seal provided by the deckle rod, with resulting resin leakage through the exit orifice.

A further drawback is the tendency of stagnation and build up of resin that leaks behind the upper and lower deckle members, with residual resin build up on or near a support rod or deckle rod hindering rod movement. Deleterious degradation of resin and deposit may additionally produce aesthetically unacceptable striations on the web surface.

Leakage of resin through the end plates and around support rods for deckle members also needs to be better controlled. Also, the extrusion of a web of inconsistent width, more particularly a web having a wavy or scalloped edge, needs to be overcome.

Thus, there continues to be a need for an improved extrusion apparatus that includes an internal deckle system.

SUMMARY OF THE INVENTION

It is accordingly an object of the present invention to provide an improved extrusion apparatus that includes an internal deckle system.

It is a further object to provide an extrusion apparatus having an edge bead-reducing, internal deckle member that resists deflection and bending.

It is a still further object to provide an extrusion apparatus that reduces internal deckle rod deflection and bending.

It is an even further object to provide an extrusion apparatus that reduces deleterious stagnation and build-up of molten material in void spaces of the flow passageway.

It is an additional object to provide an extrusion apparatus that reduces polymer leakage through apertures in end plates, for internal deckle, support members.

It is an even additional object to provide an extrusion apparatus that overcomes the economically wasteful extrusion of a web having a wavy or scalloped edge.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an extrusion apparatus comprising a main body including a flow passageway. The flow passageway includes in a main flow direction, a transverse flow-providing manifold, a land channel terminating in an exit orifice in the form of a slot having a gap which extends along the width of the extrusion apparatus, and a preland channel located between, and providing for fluid communication between, the manifold and the land channel.

Beneficially, in a first preferred embodiment of the present invention, a deckle blade extends through an end of the main body into, and is movably disposed within, the preland channel. This embodiment beneficially further includes an independently adjustable, upper deckle plug disposed within the manifold of the flow passageway, and a deckle rod movably disposed within the preland channel and downstream of the deckle blade. The apparatus may advantageously include a cold-formable, sealing member for preventing leakage through the end of the main body.

In a variation, the upper deckle plug may include a sealing member formable under heat and compression to prevent leakage transversely past the upper deckle plug. In a further variation, a full width, upper deckle plug may extend through an end of the main body into the manifold. In these variations, the deckle blade may be replaced by a conventional independently adjustable, lower deckle plug.

In a second preferred embodiment of the present invention, the upper deckle plug may be omitted. In a variation, a wavy or scalloped edge may be avoided by a flag-shaped member that extends downwardly through the land channel and advantageously terminates at or near the exit orifice.

In the drawing and detailed description of the invention that follow, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

FIG. 1 is a view of a first preferred embodiment of an extrusion apparatus in accordance with the present invention;

FIG. 2 is an enlarged, cross-sectional view taken substantially along line 2—2 of FIG. 1;

FIG. 3 is a partial plan view taken substantially along line 3—3 of FIG. 2;

FIG. 4 is a simplified, exploded view of the portion of the apparatus shown in FIG. 3;

FIG. 5 is a partial plan view similar to that of FIG. 3, of a variation of the extrusion apparatus of FIG. 1;

FIG. 6 is a partial plan view similar to that of FIG. 3, of another variation of the extrusion apparatus of FIG. 1;

FIG. 8 is an enlarged, cross-sectional view taken substantially along line 8—8 of FIG. 7;

FIG. 9 is a partial plan view taken substantially along line 9—9 of FIG. 8;

FIG. 10 is a cross-sectional view similar to that of FIG. 8, of a variation of the extrusion apparatus of FIG. 7;

FIG. 11 is a partial plan view taken substantially along line 11—11 of FIG. 10;

FIG. 12 is a cross-sectional view similar to that of FIG. 8, of another variation of the extrusion apparatus of FIG. 7; and FIG. 13 is a partial plan view taken substantially along line 13—13 of FIG. 12.

DETAILED DESCRIPTION OF THE INVENTION

Figure 7:
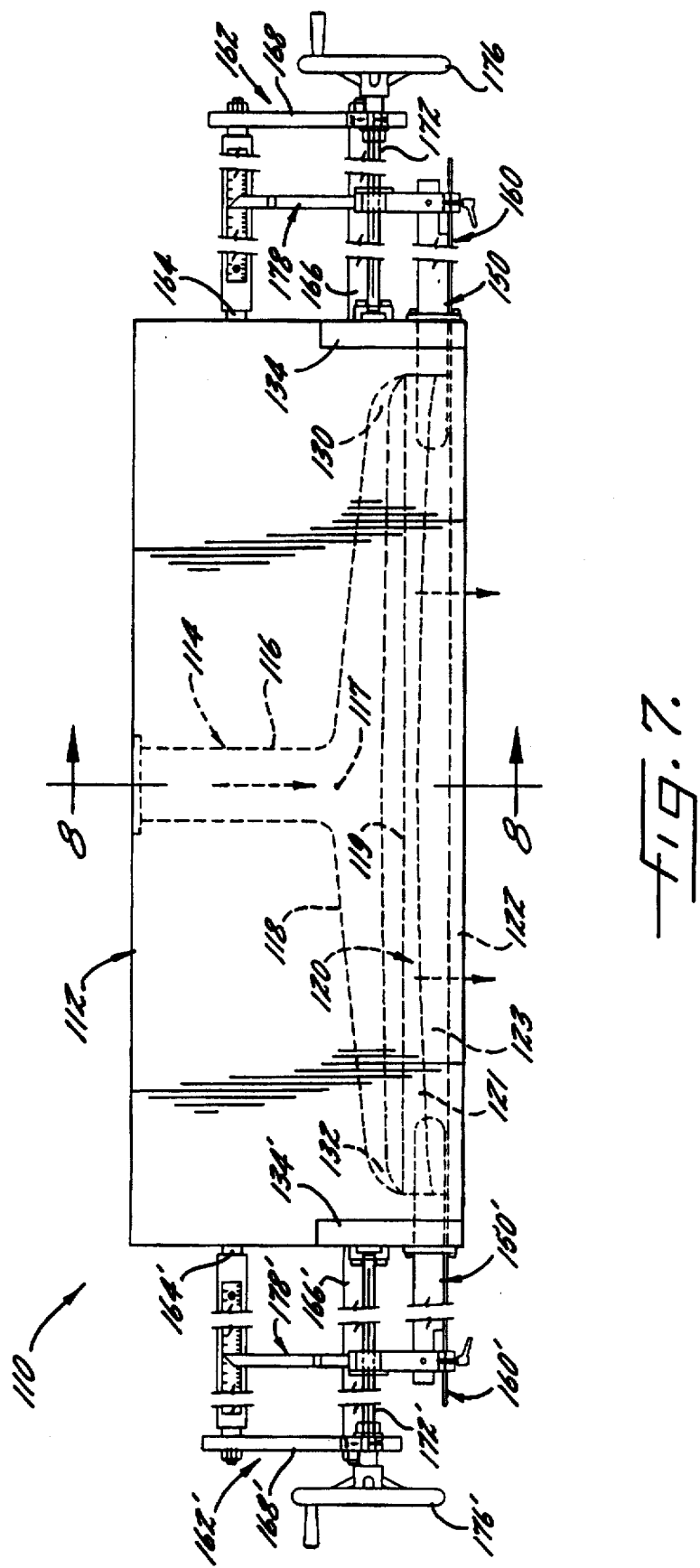
FIG. 7 is a view similar to that of FIG. 1, of a second preferred embodiment of an extrusion apparatus in accordance with the present invention.

The present invention is directed to a novel extrusion apparatus including an internal deckle system. Advantageously, the apparatus includes an edge bead-reducing, internal deckle member that can withstand the working forces of a high pressure extrusion process, and reduces deflection and bending of a downstream, internal deckle rod under such conditions.

Beneficially, stagnation and build-up of polymer in void, flow passageway spaces and on or near deckle members or their support members are reduced, as is deleterious degradation and deposit of the polymer. Moreover, the novel apparatus is able to reduce polymer leakage through apertures in end plates. Also, the apparatus advantageously may extrude a web free of a wavy or scalloped edge. Although reference is primarily made to polymeric materials in this description, it will be appreciated that the invention is likewise applicable to non-polymeric materials.

Referring to FIGS. 1 to 4, a preferred embodiment of an extrusion apparatus 10 in accordance with the present invention, is shown. The apparatus includes a main body 12 having a flow passageway 14, which provides for a main direction of flow indicated by arrows. The flow passageway includes in downstream order, a feed channel 16, a transverse flow-providing manifold 18 by which a flow stream is spread widthwise, a preland channel 20, and a land channel 22 that terminates in an exit slot 24 formed by lips 26, 28.

Conveniently, the manifold has a generally rectangular cross-section of substantially constant cross-sectional area from one end 30 to the other end 32. Alternatively, the manifold cross-section may be generally circular or tear drop-shaped.

Extending through an end plate 34 of main body 12 into manifold 18, and disposed generally parallel to the exit slot, is a support rod 38 to which an adjustable, upper deckle plug 40 is secured at an inner rod end 41. Upper plug 40 is disposed within the manifold and conveniently includes a fin portion 43 disposed within an upper portion 42 of preland channel 20. Beneficially, the upper plug has a concavely radiused face 44, and a trailing edge 46 that is also generally parallel to exit slot 24.

Extending through the end plate into the preland channel, and disposed generally parallel to the exit slot, is an independently adjustable, lower deckle plug 50 beneficially in the form of a deckle blade. By the term "deckle blade" is meant for purposes of this description, a generally blade-shaped, deckle member disposed in the preland channel and having a transverse dimension substantially equal to or exceeding the maximum engagement of the member in the preland channel. Generally speaking, maximum engagement will be about 25% of the channel width.

Deckle blade 50 beneficially terminates in an end 52 having an upstream edge 54 with a generally square corner and a trailing edge 56 that may be convexly radiused. The upstream edge is closely adjacent to trailing edge 46 of upper deckle plug 40, with clearance being provided to avoid frictional contact during adjustment. Concavely radiused face 44 of the upper plug and convexly radiused, trailing edge 56 of the blade end promote thinning of the edge flow under laminar flow conditions.

Also extending through the end plate into the preland channel, and disposed generally parallel to the exit slot, is an independently adjustable, deckle rod 60. Beneficially, rod 60 is positioned proximate to a transition wall 58 separating the preland channel from the land channel, and receives structural support from the transition wall, adjacent preland channel walls, and the trailing edge of deckle blade 50. Beneficially, the deckle rod is therefore closely adjacent to the trailing edge of the deckle blade; clearance is provided to avoid frictional contact during adjustment of either member.

Deckle members 40, 50, 60 advantageously form a precise sliding fit in flow passageway 14. More particularly, deckle plug 40 is provided with a shape that is in precision sliding fit relationship with the manifold and an upper portion of the preland channel. The fit of the deckle blade is such that it presents a flat surface forming a complete closure of the respective channel portion except for the necessary mechanical clearance.

Deckle blade 50 beneficially overcomes the deflection sensitivity and bending associated with the support rod for the independently adjustable, lower deckle portion of U.S. Pat. No. 4,659,302 to Maejima. Furthermore, blade 50 advantageously reduces the volumetric area that may be filled by polymer which may leak behind the manifold and preland deckle plugs, and thus reduces stagnation and build up of such polymer. As a result, ease of adjustability of the deckle blade and downstream deckle rod 60 is maintained, and deleterious degradation of polymer and deposit thereof is reduced. Moreover, blade 50 prevents the flow pressure of polymer leaking behind upper plug 40, from adversely deflecting or bending deckle rod 60.

With reference particularly to FIGS. 3 and 4, in supporting connection with deckle members 40, 50, 60 is an adjustment mechanism 62 for mechanically adjusting the extent of the deckle members within the flow passageway. The adjustment mechanism includes support shafts 64, 66 each rigidly secured to main body 12 at one end, and securely connected at the other end to an irregularly-shaped, joining member 68. An inner end 70 of a rotatable shaft 72 is in threaded engagement with an internally threaded bore of support rod 38, and an outer end 74 extends through and is supported by joining member 68.

A shaft-rotating device 76 conveniently in the form of a hand wheel, is connected to outer end 74 of the rotatable shaft. Rotation of the shaft may alternatively be provided by a pneumatically or electrically powered driving device.

Connected to and extending above and below, support rod 38 is a generally vertically oriented member 78. An upper end 80 of member 78 terminates in a pointer that cooperates with a indicator scale 82 mounted on a sleeve 84 on support shaft 64, to indicate the relative positioning of the deckles. A stop member 85 is beneficially secured to member 78.

A lower portion 86 of member 78 is fastened to and supports an outer portion 87 of the blade and an outer portion 88 of the deckle rod, located outside main body 12. For this purpose, blade portion 87 is slotted for connection with support member 78, and lower portion 86 of member 78 is provided with a slot through which outer deckle rod portion 88 extends. Tightening mechanisms 89, 90 respectively lock the blade and deckle rod in place.

Accordingly, deckle members 40, 50 may be adjusted independently of each other and of member 60, as needed. Shaft-rotating device 76 may be used to provide simultaneous movement of the three deckles.

With particular reference to FIG. 4, to prevent leakage through side plate 34 around blade 50, which would otherwise due to its size and shape, exacerbate the leakage problem typical in the prior art, a retainer member 91 and a sealing gasket 92 that cold forms under compression, are beneficially employed. For this purpose, a sealing gasket of modified PTFE commercially available under the registered trademark GYLON from Garlock Inc., and in particular selected from the GYLON 3500 series, may be advantageously used. Other suitable cold-forming, gasket members may alternatively be employed.

In a variation shown in FIG. 5, a sealing member 93 that is compressible and formable under heat and pressure, is advantageously disposed between an end 94 of the upper deckle plug and a backing member 95. Member 93 prevents leakage transversely past the upper deckle plug, and during adjustment, wipes the manifold free of and prevents deleterious build up of polymer. Thus, a troublesome leakage problem in the prior art even when the upper deckle plug is in a precision sliding fit relationship with the flow passageway, may be overcome by the present invention. For this purpose, a sealing member 93 of similar composition to a GYLON sealing gasket, may be used. The sealing gasket composition selected will depend upon the extrusion operating conditions; however, compressibility and creep relaxation values of less than about 50% will typically be desirable in this application.

In another variation, shown in FIG. 6, a full width, upper deckle plug 40A may extend through the end plate into the flow passageway. By "full width" is meant for purposes of this description, a transverse dimension of an upper deckle plug substantially equal to or exceeding the maximum engagement of the plug in the transverse flow-providing manifold. Generally speaking, a maximum engagement length will be about 25% of the manifold width. Beneficially, this variation further reduces the void space into which polymer may leak with the build-up of deleterious deposits, and as a result, polymer drain holes may be omitted.

To prevent leakage through end plate 34 around full width, deckle plug 40A, a retainer and a sealing gasket similar to gasket 92, may be advantageously employed. Additionally, a flow passageway-sealing member similar to sealing gasket 93, may be used, and in this case, the upper deckle plug may be conveniently provided by two members, with the second member serving as the backing member.

In FIGS. 5 and 6, like parts are designated with like numbers with respect to FIGS. 1–4. Similarly, the internal deckle members and adjusting mechanism components for manifold end 32 of the extrusion apparatus of FIG. 1, are designated with numbers corresponding to the members and components for manifold end 30.

As can be understood, a preferred apparatus in accordance with a first aspect of the present invention, includes an internal deckle system formed in downsteam order, by a deckle blade and a deckle rod that extend into the preland channel. In this way, the inventive apparatus overcomes the deflection sensitivity and bending associated with the support rod for the independently adjustable, lower deckle portion of U.S. Pat. No. 4,659,302 to Maejima, reduces the available volumetric area in which polymer stagnation and build up may occur, and reduces deckle rod deflection.

For some applications, the modified, upper deckle plug of FIG. 5 or 6 could be used with a separately adjustable, lower deckle plug and support rod as taught by U.S. Pat. No. 4,659,302 to Maejima. In this configuration, a modified upper deckle plug in accordance with the present invention, would reduce deflection of a lower deckle member otherwise caused by the flow pressure of leaking resin.

In operation of extrusion apparatus 10, the shaft rotating device is used to simultaneously move the three deckle members, with the pointer at end 80 of support member 78 indicating a selected set point on indicator scale 82. Thereafter, resin flow through apparatus 10 is begun. If desired or necessary, deckle plug 40 and deckle blade 50 may be further independently adjusted to reduce edge bead.

Referring to FIGS. 7 to 9, a second preferred embodiment of an extrusion apparatus in accordance with the present invention, is shown. Apparatus 110 of this embodiment lacks an upper deckle plug but otherwise corresponds in many respects to apparatus 10 as indicated by the use of corresponding numbers to designate like parts. For sake of brevity therefore, details previously described are not repeated.

This embodiment may be selected for cast film extrusion, or for extruding a web of uniform thickness from a comparatively higher viscosity material than may be extruded by the apparatus of the first embodiment, which is better suited for the extrusion of relatively low viscosity materials. Suitability for cast film extrusion arises because cast film extrusion typically involves trimming away some of the web edge and recycling the trim, and thus beadless extrusion is not necessary. However, no edge bead may be formed in some applications of this embodiment. Advantageously, this embodiment may also be retrofit onto conventional coat-hanger type, extrusion dies.

Usefulness for processing higher viscosity materials is made feasible by the absence of an upper deckle plug, and this permits a manifold of diminishing cross-sectional area to be used in combination with a pressure drop-compensating zone. Thus, with reference to FIGS. 7 to 9, a manifold 118 within a main body 112 of apparatus 110 beneficially has a generally rectangular cross-section of diminishing cross-sectional area from a locus 117 of flow divergence to each of manifold ends 130, 132, and has a rectilinear output edge 119. Alternatively, the manifold cross-section may be generally circular or tear drop-shaped.

A pressure drop-compensating, preland channel 120 advantageously incrementally compensates for progressive decrease in flow pressure from locus 117 to each manifold end. For this purpose, the preland channel includes secondary and primary stages 121, 123 formed by an undercut preland 125 and a preland 127, respectively, each of appropriate length in the main flow direction. Alternatively, the pressure drop-compensating preland could be that of a conventional coat-hanger type, extrusion apparatus.

Apparatus 110 provides an internal deckle including an edge bead-reducing, deckle blade 150 and a width-controlling, deckle rod 160. The deckle blade beneficially terminates in a curved end 151 that is convex outwardly, and that may be considered to be generally tongue-shaped. Thus, a leading edge 154 and a trailing edge 156 of blade end 151 may be convexly radiused.

With particular reference to FIG. 9, which shows the deckle members in a retracted position, and in an extended position in phantom, beneficially disposed within a bore in main body 112 and proximate to the retracted, functional end of the deckle blade is a heating element 157 such as a cartridge heating element, which may be independently controllable. The purpose of this heating element is explained further below.

The deckle rod is closely adjacent to the trailing edge of the blade. Clearance is, however, provided to avoid frictional contact between the deckle members when either is being adjusted. The deckle blade and deckle rod form a precise sliding fit in the preland channel.

An adjustment mechanism 162 includes a rotatable shaft 172 having an enlarged inner end 170 secured in a retainer member 173 attached to main body 112. Axially movable along, and extending above and below, the rotatable shaft is a generally vertically oriented member 178 fitted with a sleeve 179 that provides an internally threaded bore for threaded contact with the rotatable shaft.

Referring to FIGS. 10 and 11, a variation of the embodiment of FIGS. 7 to 9 is shown. Corresponding numbers designate like parts. This variation generally corresponds to apparatus 110, except that an end 161 of the deckle rod may be beneficially provided with a flag-shaped member 163 that has a trailing edge 165 that advantageously extends downwardly to or near an exit slot 124, typically within about 1 to 3 mm of the exit slot.

It typically would be undesirable in an extrusion apparatus of the present invention, for a flag member or deckle member to extend through and downward beyond the exit slot, for the reason that cooling of the polymer flow-contacting surface of the member may be promoted. As part of this invention, it has been discovered that such cooling negatively impacts edge bead reduction and edge stability.

Similarly, in minimizing edge bead, it is an objective when, for instance the deckle blade is in a retracted position, to prevent ambient cooling of the deckle blade portion exterior to the extrusion apparatus, from negatively influencing the polymer flow temperature at the polymer flow-contacting, blade face. For this reason, with reference again to FIGS. 8 and 9, heating element 157 is beneficially employed, in order to maintain the retracted, functional end at substantially the same temperature as that of the polymer. It will therefore be understood that heating element 157, though not depicted, may likewise be beneficially employed in the first preferred embodiment of the present invention, as well as in the variations of the first and second preferred embodiments described herein.

With continued reference to FIGS. 10 and 11, flag 163 beneficially prevents a web of inconsistent width, more particularly having a wavy or scalloped edge, from being formed. This edge problem is believed to result from a cavitation effect and inconsistent flow volume around the end of the furthest downstream, deckle member. It will be appreciated that this variation may likewise be applied to the first preferred embodiment of this invention.

Referring to FIGS. 12 and 13, a second variation of the embodiment of FIGS. 7 to 9 is shown. This variation generally corresponds to apparatus 110, except that the deckle rod is omitted, and a trailing edge 156 of a deckle blade 150 is disposed proximate to a transition wall 158 separating the preland and land channels. Also, as shown, a flag-shaped member 163 may be secured to the trailing edge of blade end 151. As a consequence, generally blade-shaped, deckle plug 150 has a portion that extends in the direction of the exit orifice and terminates upstream of or at the exit orifice. Corresponding numbers designate like parts.

Although not depicted, it may be advantageous in certain applications, for the leading edge of the deckle blade to be proximate to the leading edge of the preland channel. Thus, for instance with reference to the variation of FIGS. 12 and 13, the deckle blade could have a length in the main flow direction that extends from the leading edge of the preland channel to transition wall 158.

Having described the invention in detail and by reference to preferred embodiments thereof, it will be apparent that modifications are possible without departing from the scope of the invention defined in the appended claims. Several modifications have been briefly mentioned for purposes of illustration.

We claim:

1. An extrusion apparatus having an internal deckle system, said extrusion apparatus comprising a body portion comprising a flow passageway comprising a transverse flow-providing manifold, and a channel portion extending to an exit orifice, said channel portion being in fluid communication with said manifold; said internal deckle system comprising a deckle adjustably disposed to change the width of said flow passageway, said deckle comprising a manifold plug, and disposed between said manifold plug and a backing member, a sealing member formable under heat and compression to prevent leakage transversely past said manifold plug, wherein said backing member and said sealing member are disposed within said flow passageway.

2. The extrusion apparatus of claim 1, said internal deckle system further comprising a generally blade-shaped, deckle plug extending through an end of said body portion into said flow passageway, said generally blade-shaped, deckle plug being downstream of said manifold.

3. An extrusion apparatus having an internal deckle system, said extrusion apparatus comprising a body portion comprising a flow passageway comprising a transverse flow-providing manifold, and a flow passageway portion comprising an exit channel terminating in an exit orifice;

wherein, downstream of said manifold, said internal deckle system consists of a generally blade-shaped, deckle plug extending through an end of said body portion into said flow passageway, and adjustably disposed to change the width of said flow passageway and having a transverse dimension substantially equal to or exceeding the maximum engagement of said generally blade-shaped, deckle plug in said flow passageway, said generally blade-shaped, deckle plug having a flow-contacting end, a trailing edge and an extended portion at said flow-contacting end that extends from said trailing edge to terminate at a location selected from at said exit orifice, and proximate to but upstream of said exit orifice; and wherein said internal deckle system further comprises a deckle member within said manifold.

4. The extrusion apparatus of claim 3, wherein said extended portion terminates at said exit orifice.

5. The extrusion apparatus of claim 3, wherein said extended portion terminates proximate to but upstream of said exit orifice.

6. The extrusion apparatus of claim 3, further comprising heating means located within said body portion in heating communication with a partially retracted end of said generally blade-shaped, deckle plug, for maintaining said deckle plug end at substantially the same temperature as that of a stream within said flow passageway.

7. The extrusion apparatus of claim 3, wherein said deckle member within said manifold is adjustable independently of said generally blade-shaped, deckle plug.

8. The extrusion apparatus of claim 3, wherein said trailing edge of said generally blade-shaped, deckle plug is disposed proximate to a transition wall leading to said exit channel.

* * * * *